Nov. 15, 1949          R. H. BIGHAM          2,487,844
                      INDICATING SQUARE
Filed Jan. 24, 1948                    2 Sheets-Sheet 2
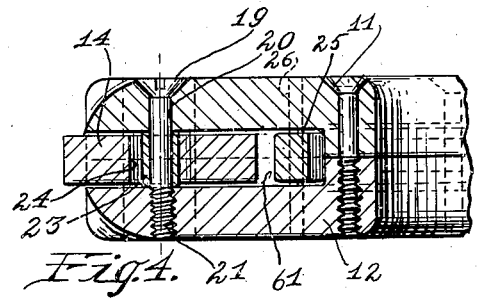
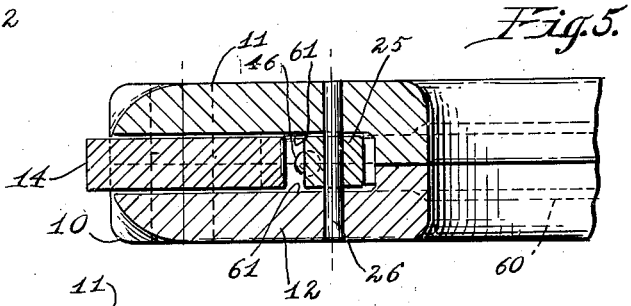
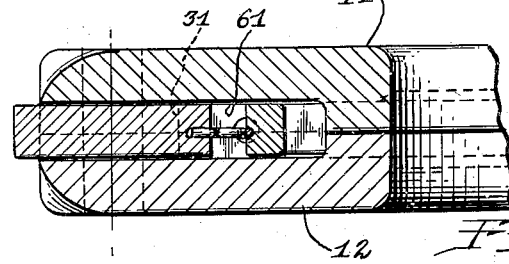
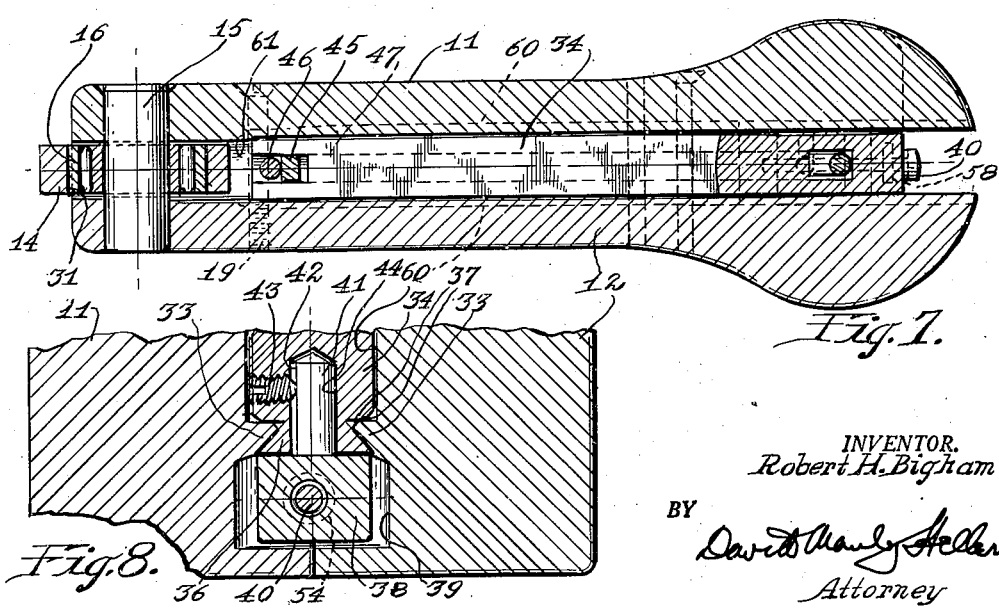
INVENTOR.
Robert H. Bigham
BY
Attorney Patented Nov. 15, 1949

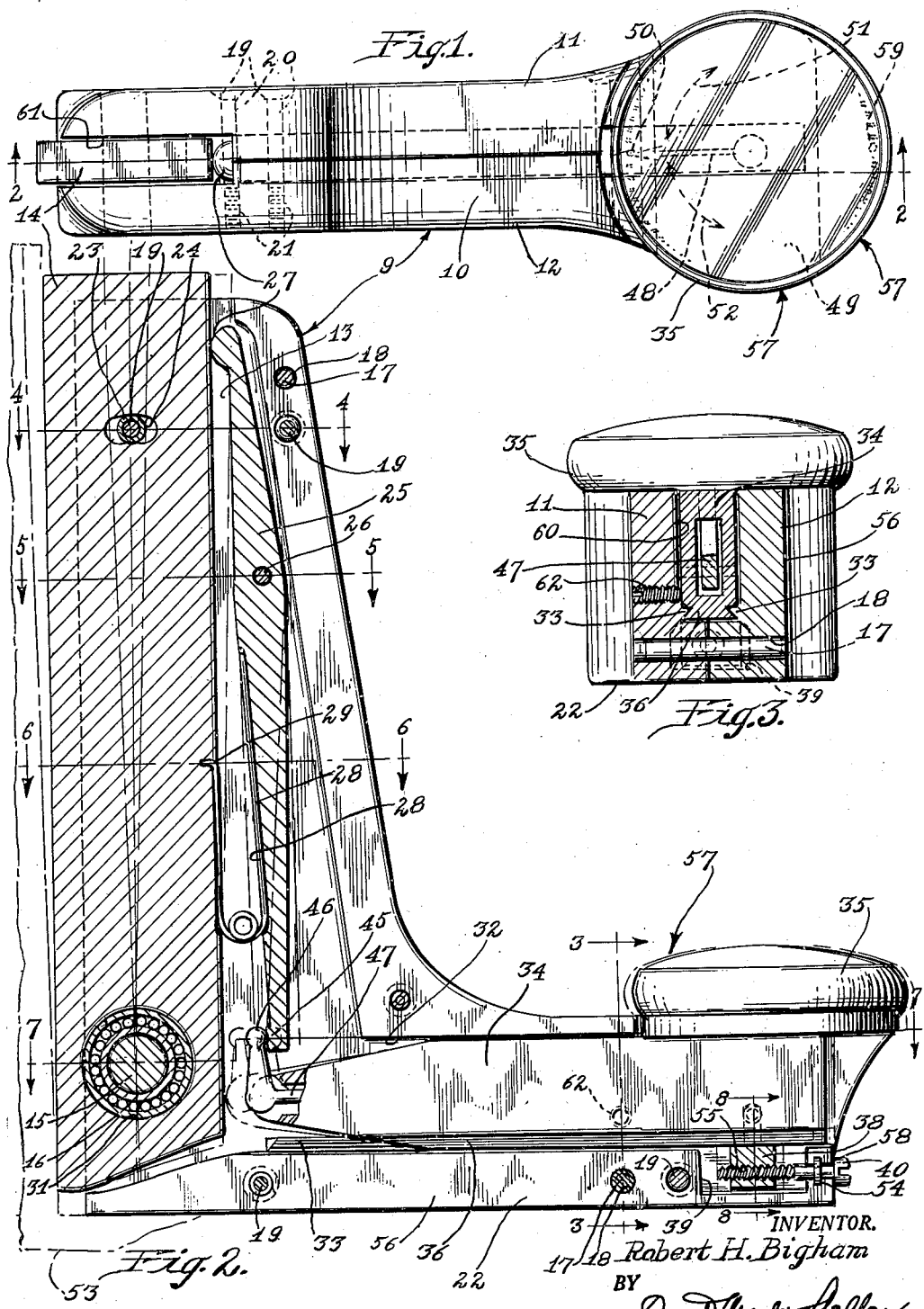

2,487,844

UNITED STATES PATENT OFFICE 2,487,844

INDICATING SQUARE

Robert H. Bigham, Chicago, Ill.

Application January 24, 1948, Serial No. 4,129

12 Claims. (Cl. 33—75)

My invention relates to indicating squares, particularly adaptable for tool construction work.

The present primitive methods of gauging tool construction work requires the placing of a fixed square against the surface of the said work and requires the ability to see minute pencils of light between the fixed square and the work as the said fixed square is moved along the surface being gauged. On inaccessible work surfaces, this is often difficult if not impossible to do accurately; therefore, I have devised an instrument having one movable and one fixed edge for this type of work.

Hence, an object of my invention is to provide a tool to remedy the above-mentioned difficulty, which consists of a square having one fixed edge, and one movable edge articulately operative in relation to the said fixed edge. The said movable edge, through a suitable lever mechanism activates the needle of a calibrated indicator dial associated therewith. Thus the needle on the said indicator dial will show plus or minus readings in thousandths of an inch of deviations from a 90° angle when applied to the work.

A further object of my invention is to provide an indicating square, of the above-mentioned character, having an adjustment means whereby the said needle on the indicator dial may be set to zero when the indicating square is placed with the movable straight edge in contact with a 90° true gauge.

A still further object of my invention is to provide a movement limiting means for the movable straight edge element of my indicating square.

A further object of my invention is to provide an indicating square, having a spring means so mounted as to maintain the movable straight edge in a normal outermost position, causing the needle on the said indicator dial to read from to a minus four one-thousandths of an inch up to a plus four one-thousandths as the said indicating square is applied to work; in other words, having a total approximate range of eight one-thousandths of an inch.

A still further object of my invention is to provide an indicating square in which, by virtue of the above-mentioned spring means, together with ball-bearing mounting means for the movable straight edge, will prevent any back-lash or lost motion in the angular movement of the said straight edge as the indicating square is applied to work, to give exact reading thereof.

A further object of my invention is to provide an indicating square that is easily assembled and can be economically manufactured in large quantities.

Other objects and advantages embraced in my invention will be disclosed in the following description and the accompanying illustrations, in which like parts are designated by like numerals, and in which:

Fig. 1 represents a top view of my invention.

Fig. 2 is a front view of my invention, partly in cross section, and taken substantially on line 2—2 on Fig. 1.

Fig. 3 is a cross-sectional view of my invention taken substantially on line 3—3 on Fig. 2.

Fig. 4 is a cross-sectional view of a portion of my invention taken substantially on line 4—4 on Fig. 2.

Fig. 5 is a cross-sectional view of a portion of my invention taken substantially on line 5—5 on Fig. 2.

Fig. 6 is a cross-sectional view of a portion of my invention taken substantially on line 6—6 on Fig. 2.

Fig. 7 is a cross-sectional view of my invention taken substantially on line 7—7 on Fig. 2.

Fig. 8 is an enlarged, cross-sectional view of a portion of my invention taken substantially on line 8—8 on Fig. 2.

Referring to the illustrations, my invention is generally designated 9, and consists of an L-shaped body 10, constructed of two identical but oppositely-formed mating halves 11 and 12. Recesses 13 are formed in the upright or vertical portions of the mating halves 11 and 12. The said recesses 13 communicate at the bottoms of the L-shaped portion with horizontal recesses 32 in the base portions 56 of the said mating halves 11 and 12. The horizontal recesses 32 form a central opening 60 therethrough when the mating halves 11 and 12 are assembled, and in the same manner the recesses 13 form a vertical recess 61.

The said mating halves 11 and 12 are preferably made of tool steel and are provided with a number of aligned holes 18. The said halves 11 and 12 are assembled by inserting dowel pins 17 in a light push fit in the said aligned holes 18. The said mating halves 11 and 12 are secured together by means of a number of machine screws 19 in the aligned countersunk holes 20 of half 11 and the tapped holes 21 in half 12, as shown in Figs. 2 and 4.

A movable straight edge 14 is articulately mounted in vertical recess 61 by means of a ball-bearing unit 16. The outer race thereof is assembled by drive fit within the bore 31 at the lower end of the said movable straight edge 14. The inner race of the said ball-bearing unit 16 is mounted on a pin 15 affixed in mating half 11. The bottom 22 of the indicating square 9 forms the fixed straight edge, as shown in Fig. 2.

An arcuately-formed slot 24 for limiting the movement of straight edge 14 is provided near the top end of the said movable straight edge 14, and a spacer 23 is fitted therein by means of one of the assembly screws 19. An indicator actuating lever 25 is fulcrumed within the vertical recess 61 and behind the movable straight edge 14 by a pin 26, through the sides of the said housing 10; the top end of the lever 25 is formed into a ball-shaped straight edge contactor 27. A hair-pin spring 28 is mounted between the said straight edge 14 and the actuating lever 25; one end 29 being anchored in the side of straight edge 14, the other end 30 resting in a groove in the actuating lever 25.

The sides of the said central opening 60 are provided with beveled tongues 33, as shown in Figs. 3 and 8. The bottom edges of a mounting bar 34 of the angle measuring indicator 35 are dovetailed at 36 to ride upon the said tongues 33, thus providing a close fit to the lateral movement of the said indicator mounting bar 34. The dovetailed edges 36 and the beveled tongues 33 are chamfered at 37 to prevent binding thereof, as shown in Fig. 8.

A cavity 39 is formed in the base 56 at its outer end to communicate with the central opening 60, and to provide housing for an indicator adjusting lug 38 which is attached to the indicator mounting bar 34 on its lower side by means of a reduced extension 41 on the said adjusting lug 38. The reduced extension 41 extends into a counterbored hole 44 in mounting bar 34 and is held there by means of a set screw 43 in the side of the said mounting bar 34 and a flat 42 on the reduced extension 41. A set screw 62, through the side of base 56, maintains the said mounting bar 34 in locked position within the central opening 60.

The bottom end of the indicator actuating lever 25 is formed into an indicator contactor 45, which by means of hair-pin spring 28 is caused to bear, at all times, against the ball end 46 fixed on the end of an indicator connector 47. The said ball 46 and contactor 45 are maintained in engagement by means of a series of indicator connecting levers 47 to the spring-urged indicator needle 48, which is mounted upon the calibrated indicator dial 49. The said indicator dial 49 is calibrated in thousandths of an inch both ways from zero, which is designated 50, to a point 59 on the opposite side of the dial, as shown in Fig. 1. The said calibrations on the said indicator dial are spaced far enough apart so as to afford ease in reading thousandths of an inch. Multiplying leverage and mechanism, common to the standard construction of indicators, produces a large deflection of the needle for minute movements at point 46.

The indicator means, which is generally designated 57, is maintained in adjustment with the indicating square 9 by means of a shoulder adjustment screw 40, within a tapped hole 55 in the indicator adjusting lug 38. The shoulder 58 of the said adjustment screw 40 rides within circular counterbores 54 formed on the inside edges of the mating halves 11 and 12, as shown in Figs. 2 and 3.

To use my indicating square, the indicator needle 48 is first adjusted to zero on dial 49 by placing the indicating square against a 90° true gauge 53. The said needle 48 is adjusted to zero by turning the adjustment screw 40. Upon removing the indicating square 9 from the setting square 53, the movable straight edge 14, urged by hair-pin spring 28, will assume its outermost position, as shown in phantom lines in Fig. 2, allowing the spring-urged needle 48 to rotate in the direction of the arrow 52 to the point 59 on the said calibrated dial 49. As the said indicating square 9 is applied to work, the needle 48 will rotate clockwise toward zero 50 and will register the minus reading indicating low spots on the said calibrated dial 49 in increments of fractional units per unit, or angular measurements.

If the work surface being engaged has a plus or forwardly-inclined angle, the said needle 48 will pass zero 50 in a clockwise movement, as indicated by arrow 51, and will register plus readings or high spots upon the said calibrated dial 49.

My indicating square is of particular value in that it will register the exact deviation from 90° of the surface being gauged in readings of up to ten thousandths of an inch plus or minus. The said dial readings may be attained on parts of work inaccessible to the visual reading required on manually set indicating squares.

I believe that I have herein shown and revealed the nature of the construction and operation of my invention in rather succinct terms and, inasmuch as the same is susceptible of many modifications, alterations, and improvements, I hereby reserve the right to all such modifications, alterations, and improvements which come within the scope and spirit of my invention, as well as those falling within the province and suggestions of the accompanying drawings, as well as those lying within the purview of the foregoing description; my invention to be limited only by the appended claims.

Having thus described and revealed my invention, what I claim as new, and desire to secure by Letters Patent, is:

1. An indicating square of the character described comprising, an L-shaped body the base of which acts as a fixed gauging edge, the upright section of the said body having a vertical recess therein, the said base having a horizontal recess therein, a movable gauging edge articulately mounted adjacent the said base and operative within the said vertical recess, indicator means having a mounting bar mounted within the said horizontal recess and extending throughout the length of the said horizontal recess, and amplifying indicator actuating lever means fulcrumed within the said vertical recess with one end thereof in contacting relationship with the said movable gauging edge, the other end thereof in contacting relationship with the said indicator means.

2. An indicating square of the character described comprising, an L-shaped body the base of which acts as a fixed gauging edge, the upright section of the said body having a vertical recess therein, the said base having a horizontal recess therein, a movable gauging edge articulately mounted adjacent the said base and operative within the said vertical recess, indicator means having a mounting bar mounted within the said horizontal recess and extending throughout the length of the said horizontal recess, amplifying indicator actuating lever means fulcrumed within the said vertical recess with one end thereof in contacting relationship with the said movable gauging edge, the other end thereof in contacting relationship with the said indicator means, and spring means interposed between the said movable gauging edge and the said indicator actuating lever means.

3. An indicating square of the character described comprising, an L-shaped body the base of which acts as a fixed gauging edge, the upright section of the said body having a vertical recess therein, the said base having a horizontal recess therein, a movable gauging edge articulately mounted adjacent the said base and operative within the said vertical recess, indicator means having a mounting bar mounted within the said horizontal recess and extending throughout the length of the said horizontal recess, amplifying indicator actuating lever means fulcrumed within the said vertical recess with one end thereof in contacting relationship with the said movable gauging edge, the other end thereof in contacting relationship with the said indicator means, and indicator adjusting means secured rotatably to the said base threadably engaging the said indicator means to permit regulating the position of the needle of the said indicator means with respect to the true normal measuring position of the said indicating square.

4. An indicating square of the character described comprising, an L-shaped body the base of which acts as a fixed gauging edge, the upright section of the said body having a vertical recess therein, the said base having a horizontal recess therein, a movable gauging edge articulately mounted adjacent the said base and operative within the said vertical recess, indicator means having a mounting bar mounted within the said horizontal recess and extending throughout the length of the said horizontal recess, amplifying indicator actuating lever means fulcrumed within the said vertical recess with one end thereof in contacting relationship with the said movable gauging edge, the other end thereof in contacting relationship with the said indicator means, spring means interposed between the said movable gauging edge and the said indicator actuating lever means, and indicator adjusting means secured rotatably to the said base threadably engaging the said indicator means to permit regulating the position of the needle of the said indicator means with respect to the true normal measuring position of the said indicating square.

5. An indicating square of the character described comprising, an L-shaped body the base of which acts as a fixed gauging edge, the upright section of the said body having a vertical recess therein, the said base having a horizontal recess therein, a movable gauging edge articulately mounted adjacent the said base and operative within the said vertical recess, indicator means having a mounting bar mounted within the said horizontal recess and extending throughout the length of the said horizontal recess, amplifying indicator actuating lever means fulcrumed within the said vertical recess with one end thereof in contacting relationship with the said movable gauging edge, the other end thereof in contacting relationship with the said indicator means, arcuately-formed slotted means in the upper portion of the said movable gauging edge to limit the movement thereof, and spacer means secured in the said upright section of the said body passing through the said arcuately-formed slotted means.

6. An indicating square of the character described comprising, an L-shaped body the base of which acts as a fixed gauging edge, the upright section of the said body having a vertical recess therein, the said base having a horizontal recess therein, a movable gauging edge articulately mounted adjacent the said base and operative within the said vertical recess, indicator means having a mounting bar mounted within the said horizontal recess and extending throughout the length of the said horizontal recess, amplifying indicator actuating lever means fulcrumed within the said vertical recess with one end thereof in contacting relationship with the said movable gauging edge, the other end thereof in contacting relationship with the said indicator means, spring means interposed between the said movable gauging edge and the said indicator actuating lever means, arcuately-formed slotted means in the upper portion of the said movable gauging edge to limit the movement thereof, and spacer means secured in the said upright section of the said body passing through the said arcuately-formed slotted means.

7. An indicating square of the character described comprising, an L-shaped body the base of which acts as a fixed gauging edge, the upright section of the said body having a vertical recess therein, the said base having a horizontal recess extending substantially the length of the said base, a movable gauging edge articulately mounted adjacent the said base and operative within the said vertical recess, indicator means having a mounting bar mounted within the said horizontal recess and extending throughout the length of the said horizontal recess, amplifying indicator actuating lever means fulcrumed within the said vertical recess with one end thereof in contacting relationship with the said movable gauging edge, the other end thereof in contacting relationship with the said indicator means, indicator adjustment means secured rotatably to the said base threadably engaging the said indicator means to permit regulating the position of the needle of the said indicator means with respect to the true normal measuring position of the said indicating square, arcuately-formed slotted means in the upper portion of the said movable gauging edge to limit the movement thereof, and spacer means secured in the said upright section of the said body passing through the said arcuately-formed slotted means.

8. An indicating square of the character described comprising, an L-shaped body the base of which acts as a fixed gauging edge, the upright section of the said body having a vertical recess therein, the said base having a horizontal recess extending substantially the length of the said base, a movable gauging edge articulately mounted adjacent the said base and operative within the said vertical recess, indicator means having a mounting bar mounted within the said horizontal recess and extending throughout the length of the said horizontal recess, amplifying indicator actuating lever means fulcrumed within the said vertical recess with one end thereof in contacting relationship with the said movable gauging edge, the other end thereof in contacting relationship with the said indicator means, spring means interposed between the said movable gauging edge and the said indicator actuating lever means, indicator adjustment means secured rotatably to the said base threadably engaging the said indicator means to permit regulating the position of the needle of the said indicator means with respect to the true normal measuring position of the said indicating square, arcuately-formed slotted means in the upper portion of the said movable gauging edge to limit the movement thereof, and spacer means secured in the said upright section of the said body passing through the said arcuately-formed slotted means.

9. An indicating square of the character described comprising, an L-shaped body the base of which acts as a fixed gauging edge, the upright section of the said body having a vertical recess therein, the said base having a horizontal recess extending substantially the length of the said base, a movable gauging edge articulately mounted adjacent the said base and operative within the said vertical recess, indicator means having a mounting bar mounted within the said horizontal recess and extending throughout the length of the said horizontal recess, amplifying indicator actuating lever means fulcrumed within the said vertical recess with one end thereof in contacting relationship with the said movable gauging edge, the other end thereof in contacting relationship with the said indicator means, arcuately-formed slotted means in the upper portion of the said movable gauging edge to limit the movement thereof, spacer means secured in the said upright section of the said body passing through the said arcuately-formed slotted means, and locking means secured to the said body passing into the said horizontal recess to releasably and fixedly engage the said indicator means in adjusted position.

10. An indicating square of the character described comprising, an L-shaped body the base of which acts as a fixed gauging edge, the upright section of the said body having a vertical recess therein, the said base having a horizontal recess extending substantially the length of the said base, a movable gauging edge articulately mounted adjacent the said base and operative within the said vertical recess, indicator means having a mounting bar mounted within the said horizontal recess and extending throughout the length of the said horizontal recess, amplifying indicator actuating lever means fulcrumed within the said vertical recess with one end thereof in contacting relationship with the said movable gauging edge, the other end thereof in contacting relationship with the said indicator means, spring means interposed between the said movable gauging edge and the said indicator actuating lever means, arcuately-formed slotted means in the upper portion of the said movable gauging edge to limit the movement thereof, spacer means secured in the said upright section of the said body passing through the said arcuately-formed slotted means, and locking means secured to the said body passing into the said horizontal recess to releasably and fixedly engage the said indicator means in adjusted position.

11. An indicating square of the character described comprising, an L-shaped body the base of which acts as a fixed gauging edge, the upright section of the said body having a vertical recess therein, the said base having a horizontal recess extending substantially the length of the said base, a movable gauging edge articulately mounted adjacent the said base and operative within the said vertical recess, indicator means having a mounting bar mounted within the said horizontal recess and extending throughout the length of the said horizontal recess, amplifying indicator actuating lever means fulcrumed within the said vertical recess with one end thereof in contacting relationship with the said movable gauging edge, the other end thereof in contacting relationship with the said indicator means, indicator adjustment means secured rotatably to the said base threadably engaging the said indicator means to permit regulating the position of the needle of the said indicator means with respect to the true normal measuring position of the said indicating square, arcuately-formed slotted means in the upper portion of the said movable gauging edge to limit the movement thereof, spacer means secured in the said upright section of the said body passing through the said arcuately-formed slotted means, and locking means secured to the said body passing into the said horizontal recess to releasably and fixedly engage the said indicator means in adjusted position.

12. An indicating square of the character described comprising, an L-shaped body the base of which acts as a fixed gauging edge, the upright section of the said body having a vertical recess therein, the said base having a horizontal recess extending substantially the length of the said base, a movable gauging edge articulately mounted adjacent the said base and operative within the said vertical recess, indicator means having a mounting bar mounted within the said horizontal recess and extending throughout the length of the said horizontal recess, amplifying indicator actuating lever means fulcrumed within the said vertical recess with one end thereof in contacting relationship with the said movable gauging edge, the other end thereof in contacting relationship with the said indicator means, spring means interposed between the said movable gauging edge and the said indicator actuating lever means, indicator adjustment means secured rotatably to the said base threadably engaging the said indicator means to permit regulating the position of the needle of the said indicator means with respect to the true normal measuring position of the said indicating square, arcuately-formed slotted means in the upper portion of the said movable gauging edge to limit the movement thereof, spacer means secured in the said upright section of the said body passing through the said arcuately-formed slotted means, and locking means secured to the said body passing into the said horizontal recess to releasably and fixedly engage the said indicator means in adjusted position.

ROBERT H. BIGHAM.

REFERENCES CITED

The following references are of record in the file of this patent:

UNITED STATES PATENTS

| Number | Name | Date |
| --- | --- | --- |
| 1,290,434 | Walter | Jan. 7, 1919 |
| 1,427,132 | Swartout | Aug. 29, 1922 |
| 1,634,328 | Lees | July 5, 1927 |
| 2,069,043 | Miller | Jan. 26, 1937 |
| 2,163,023 | Cierpal | June 20, 1939 |
| 2,397,280 | Leszak | Mar. 26, 1946 |